United States Patent
Tamura et al.

[11] Patent Number: 5,939,217
[45] Date of Patent: Aug. 17, 1999

[54] BATTERY AND PROTECTING ELEMENT THEREFOR

[75] Inventors: Hisaya Tamura, Kanuma; Motohide Takeichi, Yono; Norikazu Iwasaki, Tochigi, all of Japan

[73] Assignee: Sony Chemicals Corporation, Tokyo, Japan

[21] Appl. No.: 08/950,488

[22] Filed: Oct. 15, 1997

[30] Foreign Application Priority Data

Oct. 29, 1996 [JP] Japan .................................. 8-287122

[51] Int. Cl.[6] ...................................................... H01M 2/12
[52] U.S. Cl. ................................ 429/7; 429/53; 429/56; 429/61; 429/62
[58] Field of Search ................................ 429/53, 56, 61, 429/62, 64, 82, 178, 57, 58, 7

[56] References Cited

U.S. PATENT DOCUMENTS 5,750,277   5/1998   Vu et al. ........................................ 429/7
5,853,912  12/1998   Naing et al. .................................. 429/61

FOREIGN PATENT DOCUMENTS 2-244531   9/1990   Japan .
4-181625   6/1992   Japan .
4-328279  11/1992   Japan .

*Primary Examiner*—Maria Nuzzolillo
*Assistant Examiner*—Monique Wills
*Attorney, Agent, or Firm*—Flynn, Thiel, Boutell & Tanis, P.C.

[57] ABSTRACT

A battery having a protecting element which has a simple structure and is easy to be miniaturized to permit installation within the battery cell without altering the structure and the production plan of the battery cell to a considerable extent and which has a function of melting down reliably upon detection of an abnormal state of the temperature or current of the battery. The protecting element 1 is formed from a base board 5 which is composed of an insulator layer 2 interposed between a first and a second conductor layer 3 and 4 and is provided with a through-hole 6 so as to bring about electrical conduction between the first and second conductor layers, wherein one of the conductor layers (3) is subdivided into a plurality of independent conductor layer patches (3a and 3b) separated by a vacant space 7 and the so-separated patches (3a and 3b) are bridged with a low-melting metal layer 8 to provide electrical conduction therebetween to build up a fuse unit 11 sealed by a protection member 10 and a safety valve 15 is formed in the through-hole 6 by covering the through-hole 6 with a lamellar closure member 13, wherein the protecting element 1 is installed in the battery cell integrally with the cathode terminal 16 via a PTC element.

9 Claims, 2 Drawing Sheets

BATTERY AND PROTECTING ELEMENT THEREFOR

FIELD OF THE INVENTION

The present invention relates to a battery provided with a protecting element capable of being melted down caused by temperature or by current. More specifically, the invention relates to a battery having a protecting element accommodated within the battery cell and to such a protecting element.

DESCRIPTION OF THE RELATED TECHNIQUES

In a battery, a non-restorable protecting element using a fuse, such as a current-type fuse or a temperature-type fuse, is installed, in order to avoid occurrence of an accident due to, for example, an overcurrent or abnormal reaction. A current-type fuse will melt down when an electric current greater than a certain limiting value flows therethrough, whereby the battery and relating instruments, meters and so on connected thereto are protected. A temperature-type fuse will melt down upon reaching a certain limiting temperature caused by an overcurrent or by an abnormal electrode reaction, whereby the battery and so on are protected.

Hitherto, as a protecting element for battery, there are known, for example, temperature-type fuses in which a low-melting metal element covered with a flux is enclosed within an insulator casing (Japanese Patent Kokai No. 4-181625 A) and in which an electrode and the terminal therefor are bridged by a low-melting metal element in a hollow space within a base board of alumina (Japanese Patent Kokai No. 2-244531 A). Both are so designed that the protecting element is not installed within the battery cell, as shown in the Japanese Patent Kokai No. 4-328279 A, but are designed so as to be installed in a battery arrangement by being disposed in a package in which the protecting element is held in connection with the battery cell.

However, the prior art protecting elements have disadvantages. Thus, they are costly, since they are installed outside the battery in a battery arrangement which is relatively large and includes relatively greater number of constituent components and requires greater assemblage efforts. In addition, such a protecting element being installed outside the battery cell cannot serve as a temperature-type fuse. For example, it cannot detect any heat evolution due to an abnormal electrode reaction and cannot be caused to melt down upon an abnormal electrode reaction, since it is disposed apart from the battery cell. Moreover, the prior art battery protecting element is difficult to be installed within the battery cell, even if it is made in a tiny form, since it is designed as an externally connectable element. When it is designed so as to be installed within the battery cell, not only the structure but also the production process plan of the battery cell should be changed to a large extent.

SUMMARY OF THE INVENTION

An object of the present invention is to provide a battery which is provided therein with a protecting element and has a compact structure and which can detect an abnormal running state authentically and can prevent any accident therefrom by actuating the protecting element.

Another object of the present invention is to provide a battery provided therein with a protecting element which has a simple structure permitting an easy miniaturization and is capable of being installed within the battery cell without necessitating a large alteration in the structure and in the production plan of the battery and, in addition, melts down authentically upon detecting any abnormal condition of temperature or current in the battery and relieves internal pressure by detecting reliably any unusual state of the internal pressure.

A further object of the present invention is to provide a protecting element for a battery having a simple structure and permitting an easy miniaturization which allows it to be installed within the battery cell without necessitating a large alteration in the structure and in the production plan of the battery and, in addition, melts down authentically by detecting any abnormal condition of temperature or current.

Thus, the battery according to the present invention is provided therein with a battery protecting element, which comprises a cathode and an anode for effecting electrode reactions disposed in an electrode reaction part, a cathode terminal connected to the cathode, an anode terminal connected to the anode and a protecting element inserted in the connectiing current path from the cathode to the cathode terminal or in the connecting current path from the anode to the anode terminal, said protecting element comprising a base board composed of a first and a second conductor layer and an insulator layer interposed between said first and second conductor layers, a through-hole formed in the base board so as to provide electrical conduction between the first and the second conductor layers, at least one vacant space disposed in at least either one of said conductor layers in such a pattern as to leave a plurality of independent patches of conductor layer which are separated by the vacant space and one or more layers of a low-melting metal which are so arranged as to bridge the separated conductor patches to provide electrical conduction therebetween.

The battery protecting element may preferably include further a lamellar closure member fixed to the base board so as to cover and close the through-hole.

DETAILED DESCRIPTION OF THE DISCLOSURE

Figure 1:
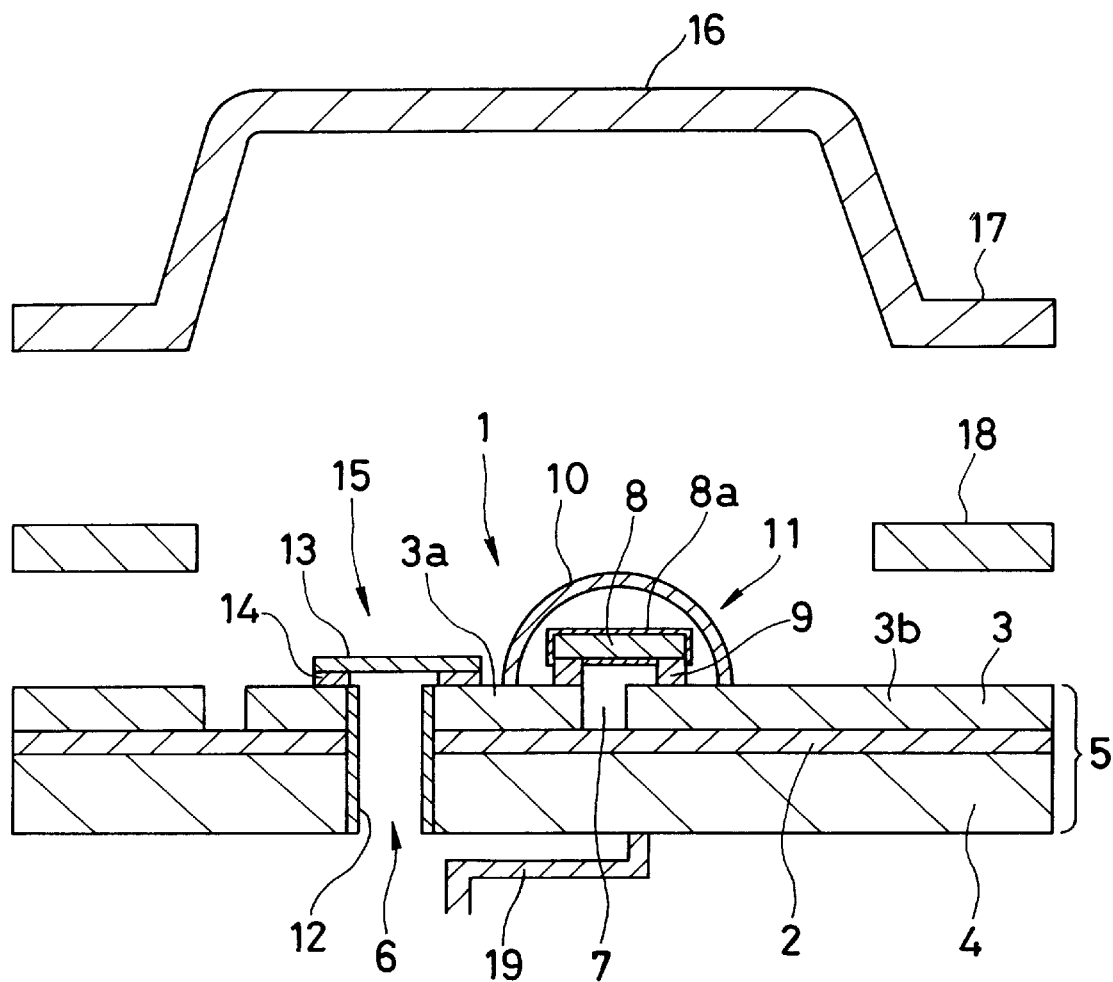
FIG. 1 shows an embodiment of the battery protecting element according to the present invention in an exploded sectional view.

The base board constituting a component member of the protecting element according to the present invention is composed of a first and a second conductor layer and an insulator layer interposed therebetweeen. Basically the base board is constituted of a ternary laminate, though it may be composed of more layers. The insulator layer may preferably be made of a plastic resin exhibiting a bonding property, such as an epoxy resin or a glass fiber-reinforced epoxy resin, which is laminated between the first and second conductor layers both consisting of, for example, a metal foil, each lying on opposite sides of the insulator layer. The geometrical configuration of the laminated base board may be in conformity with the sectional form of the battery cell and may be in, for example, a circular or a polygonal form.

The material for the conductor layers may appropriately be chosen from copper, aluminum, silver, gold, platinum, palladium, nickel, wolfram and alloys of these metals, wherein a metal which is superior in the workability, solderability and so on, such as copper, is used for the first conductor layer on the side of the cathode terminal and a metal exhibiting a better resistance against the electrolyte, such as aluminum, is employed for the second conductor layer for the electrode reaction part on the opposite side. The first conductor layer on the side of the cathode terminal is divided by one or more vacant spaces into a plurality of independent conductor layer patches of a certain pattern isolated electroconductively with each other. While the second conductor layer for the electrode reaction part may desirably cover the entire face, it is permissible to arrange the second layer so as to cover only the region allowing connection of the cathode lead thereto.

The through-hole is provided in the base board as a pierced-through hole in a conductor layer patch, wherein a layer of conductor is formed on the side wall of the through-hole to connect the first conductor layer patch with the second conductor layer to build up a connecting conductor layer. For forming the through-hole in the base board, an ordinary perforation technique may be employed, such as NC-drilling, die punching or the like. The connecting conductor layer may desirably be of copper and may be built up by inserting a collar or "grommet" made of a conductor therein or by a technique of electrodeposition of an appropriate metal. While the through-hole can serve for building up a safety valve, it is kept closed by a voluntary closure member when it is not used for the safety valve.

The low-melting metal layer connecting between the conductor layer patches is made of a low-melting metal so as to function as a temperature- or current-type fuse to melt down at a certain low temperature and one which has a melting point of 80–150° C. is preferred. As the low-melting metal, lead, tin, bismuth, silver and copper may preferably be used as a simple substance or as an alloy. The low-melting metal layer connects the conductor patch around the through-hole with the conductor patch on the side of the cathode terminal by bridging therebetween by soldering or welding.

In order to protect the surface of the low-melting metal and to attain a reliable and stable melting down thereof, the metal surface may desirably be coated with a flux. As the flux, there may be employed, for example, a resin-based flux containing rosin or a rosin derivative such as an activated rosin; an organic acid flux, such as stearic acid or oleic acid; a flux based on an organic halogen compound, such as aniline hydrochloride; and an inorganic acid flux, such as hydrochloric acid or zinc chloride, of which preference is given to a resin-based flux and an organic acid flux.

The space for the fuse in which the low-melting metal layer is disposed may preferably be sealed by a protection member, such as a cap, in order to protect the melting down space and to prevent oxidation of the fuse metal. As the protection member, there may be used insulator materials, such as polyamide resins, polyimide resins, silicone resins, fluoride resins, mica, porcelain, glass and cement-bonded products, of which polyamide resins are preferred. The shape of the protection member is not specifically restricted and any shape capable of sealing and closing the fuse melting down space in a consolidated state may be permitted.

In case the through-hole is used for a safety valve, the through-hole is covered with a sheet-like closure member fixed to the base board so as to close the through-hole to shut up passage of gas therethrough. There is no restriction for the configuration of the through-hole, so long as it permits detection of the internal pressure of the battery cell and actuation of the safety valve to vent out the internal gas to relieve the pressure, while a circular form may be preferable, since the closure member will receive thereby the internal pressure uniformly over its inner face. While the size of the through-hole may vary in accordance with the material, thickness, designed rupture pressure and so on of the closure member, a diameter of 0.5–10 mm, preferably 1–4 mm may be acceptable for the case of a circular through-hole.

The closure member is a lamellar piece which may be in a form of, for example, plate, foil, film or sheet of uniform thickness. There is no restriction as to the material therefor, so long as a uniform rupture strength is attained. A metal exhibiting a scarce temporal change of the strength is preferred therefor. Concretely, copper is preferable, since it allows easy soldering. While the thickness of the closure member may vary depending on the material employed, size thereof, settled rupture pressure and so on, generally a thickness of 5–100 μm, preferably 10–50 μm is chosen for a copper sheet and a thickness of 5–200 μm, preferably 15–80 μm is chosen for an aluminum sheet.

The closure member may have any voluntary form, though a circular form in conformity with the shape of the through-hole is preferred. The closure member has an outer span or diameter greater than that of the through-hole and is bonded to the base board in its peripheral region. For the bonding, any voluntary means may be chosen, for example, soldering, adhesion and welding. So long as the base board and the closure member are made of metal, soldering is preferable. The bonding is effected in such a manner that the periphery of the through-hole is completely sealed and any passage of gas and liquid therethrough is hindered, wherein the bonding strength should be higher than the rupture strength of the closure member. Here, it is preferable that the bonded region is in an annular form leaving preferably a circular unbonded area of a constant surface area surrounded by the bonded region.

By installing the protecting element solely or integrally with other elements, such as a PTC element (positive temperature coefficient element) and so on, within the battery cell, the battery according to the present invention is obtained. Here, the conductor layer on the side of the electrode reaction part, namely, the second conductor layer, connects to the cathode and the patch of the conductor layer on the side of the cathode terminal, namely, the first conductor layer which is separated from the conductor layer patch surrounding the through-hole, connects to the cathode terminal.

In operating the battery, the electric current generated by the electrode reaction in the electrode reaction part flows through the current path composed of the cathode lead, the second conductor layer on the side of the electrode reaction part of the base board, the connecting conductor layer in the through-hole, the first conductor layer patch surrounding the through-hole, the low-melting metal layer, the first conductor layer patch on the cathode terminal side and the cathode terminal. The melting point of the low-melting metal is chosen so that the low-melting metal will melt down by the Joule heat by an overcurrent exceeding a certain limit upon, for example, a short-circuit etc., when the battery protecting element is used as a current-type fuse. When the battery protecting element is used as a temperature-type fuse, the melting point of the low-melting metal is chosen so that it will melt down not only by Joule heat but also by a heat generated by an abnormal electrode reaction or so on.

When the low-melting metal layer is coated with a flux, an unintended current conduction due to an eventual contact of the molten metal with the current circuit is prevented by an immediate coverage of the molten metal with the flux after the melt-down. When the low-melting metal layer is enclosed by a protection member, such as a cap or the like, the melt-down occurs exclusively within the protection member, so that an accidental current conduction from the molten metal to other conductor layer can be prevented.

When a safety valve is formed in the through-hole, the protecting element according to the present invention exhibits a further function for relieving the internal pressure by rupture of the closure member upon exceeding a certain limit of the internal pressure in addition to the function of the fuse melt-down. Thus, the closure member will be punctured when the internal pressure is increased beyond a certain limiting value by occurrence of an overcurrent or an abnormal condition during the operation of the battery, whereby the internal gas will be vented out to relieve the internal pressure and, thus, an accident of burst of the battery cell can be prevented.

Since the closure member is in a lamellar form, as contrasted to the recess in the conventional safety valve formed by a pressing work, it is easy to maintain a predetermined constant thickness, so as to adjust a constant rupture strength. Thus, the actuation pressure of the safety valve can be regulated at a predetermined constant value by settling the size of the through-hole at a definite value and keeping a constant inner surface area of the closure member receiving the internal pressure, whereby the degree of safety and the reliability of the protection element are increased. Here, the actuating pressure of the safety valve can be settled voluntarily by altering the thickness of the closure member or by varying the size of the through-hole.

The safety valve can be formed within the through-hole using common component parts, since the safety valve is formed by making use of the through-hole in the base board constituting the protecting element, so that the protecting element can be constructed as a multifunctional element which is totally miniaturized, whereby it becomes possible to install it easily within a small-sized battery.

The battery protecting element according to the present invention can be installed in all the batteries irrespective of primary and secondary batteries, though it is in particular adapted to a rechargeable secondary battery.

It can be applied to primary batteries based on non-aqueous and aqueous electrolyts. For the primary batteries based on non-aqueous electrolyte, there may be enumerated, for example, graphite fluoride/lithium battery, thionyl chloride/lithium battery, silver chromate/lithium battery, vanadium pentoxide/lithium battery, copper oxide/lithium battery, iron sulfide/lithium battery and bismuth oxide/lithium battery. For the primary battery based on aqueous electrolyte, there may be enumerated, for example, alkali cells, manganese cells, Leclanche cell, silver oxide cell, mercury cells and air/zinc cell.

The battery protecting element according to the present invention can be applied to secondary batteries based on non-aqueous and aqueous electrolyte. For the secondary batteries based on non-aqueous electrolyte, there may be enumerated, for example, manganese dioxide/lithium battery, vanadium pentoxide/lithium battery, molybdenum oxide/lithium battery, titanium sulfide/lithium battery, molybdenum sulfide/lithium battery, niobium selenide/lithium battery, carbon/lithium battery and polymer/lithium batteries. For those based on aqueous electrolyte, there may be enumerated, for example, nickel/cadmium battery, nickel/hydrogen battery, nickel/zinc battery and lead storage battery.

The battery protecting element according to the present invention may be different in its melt-down temperature, melt-down current, actuating pressure required, depending on the kind, shape, size and others of the battery. In general, however, it is designed to actuate in such a manner that it melts down at a melt-down temperature of 60–200° C., preferably 80–150° C. or a melt-down current of 1–20 amperes, preferably 2–8 amperes within 60 seconds or that it is ruptured when the internal pressure exceeds a value of 0.5–4 MPa (gauge), preferably 1.5–3 MPa (gauge).

While the battery protecting element according to the present invention is adapted to be installed in the battery cell, it is of course possible that it is not accommodated within each battery cell but is used in a battery arrangement by connecting it to one or more battery cells in a battery package or in a battery case. Also in such a case, it is possible to attain a miniaturization of such a battery arrangement.

The battery protecting element according to the present invention has a simple structure, in which a low-melting metal layer is arranged to bridge between conductor layer patches formed on a multilayered base board, and, thus, it is easy to design as a small-sized element and is possible to install it within the battery cell without altering the structure of the battery cell and its production plan to a considerable extent, while attaining a reliable detection of exceeding of a certain limit of temperature and/or current to cause melt-down of the fuse authentically.

According to the present invention, it is made possible to build up a multifunctional battery protecting element for detecting reliably that the internal pressure of the battery cell has exceeded a certain limit and for effecting relief of the internal pressure, without necessitating to design the protecting element as a large-sized unit, by constructing a safety valve by making use of the through-hole formed in the multilayered base board.

According to the present invention, it is possible to realize a battery which can afford to detect an abnormal state in the temperature and current and, if necessary, in the internal pressure thereof to release the protecting operation, by installing therein the protecting element described above, whereby occurrence of any accident can be prevented.

THE BEST MODE FOR EMBODYING THE INVENTION

Below, some modes of practical application of the invention are described with reference to the appended Drawings.

Figure 2:
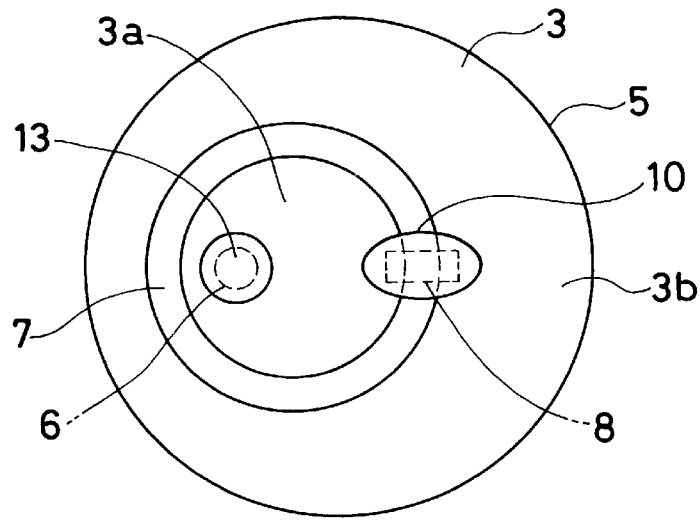
FIG. 2 shows the protecting element of FIG. 1 in a plan view.

In FIGS. 1 and 2, the numeral 1 denotes the battery protecting element according to the present invention, which is constructed from a base board 5 composed of an insulator layer 2 interposed between a first conductor layer 3 and a second conductor layer 4, wherein the base board 5 is provided with a circular through-hole 6 located at an eccentrically displaced portion thereof. The first conductor layer 3 is subdivided into a conductor layer patch 3*a* surrounding the through-hole 6 and a conductor layer patch 3*b* on the cathode terminal side by a vacant space 7. A low-melting metal layer 8 is bonded onto the conductor layer patches 3*a* and 3*b* with a bonding material 9 consisting of a solder so as to bridge them across the vacant space 7 to build up a fuse unit 11. The fuse unit 11 is encased in a protection member 10 of a cap-like form. The low-melting metal layer 8 is sheathed with a flux 8*a*.

On the side wall of the through-hole 6, a cylindrical connecting conductor layer 12 is fixedly formed, which serves for an electric conduction between the first and the second conductor layers 3 and 4. The upper end of the through-hole 6 formed in the first conductor layer patch 3*a* is covered with a disk of a lamellar closure member 13 made of copper by being bonded onto the conductor layer patch 3*a* at its peripheral region with a bonding material 14 consisting of a solder to build up a safety valve 15.

The cathode terminal 16 is pressedly bound at its flange 17 with the cathode terminal side conductor layer patch 3*b* of the first conductor layer 3 of the protecting element 1 under intermediation by a PTC element 18 to build up an electroconductive connection. 19 is a cathode lead which is connected to the second conductor layer 4 of the protecting element 1.

Figure 3:
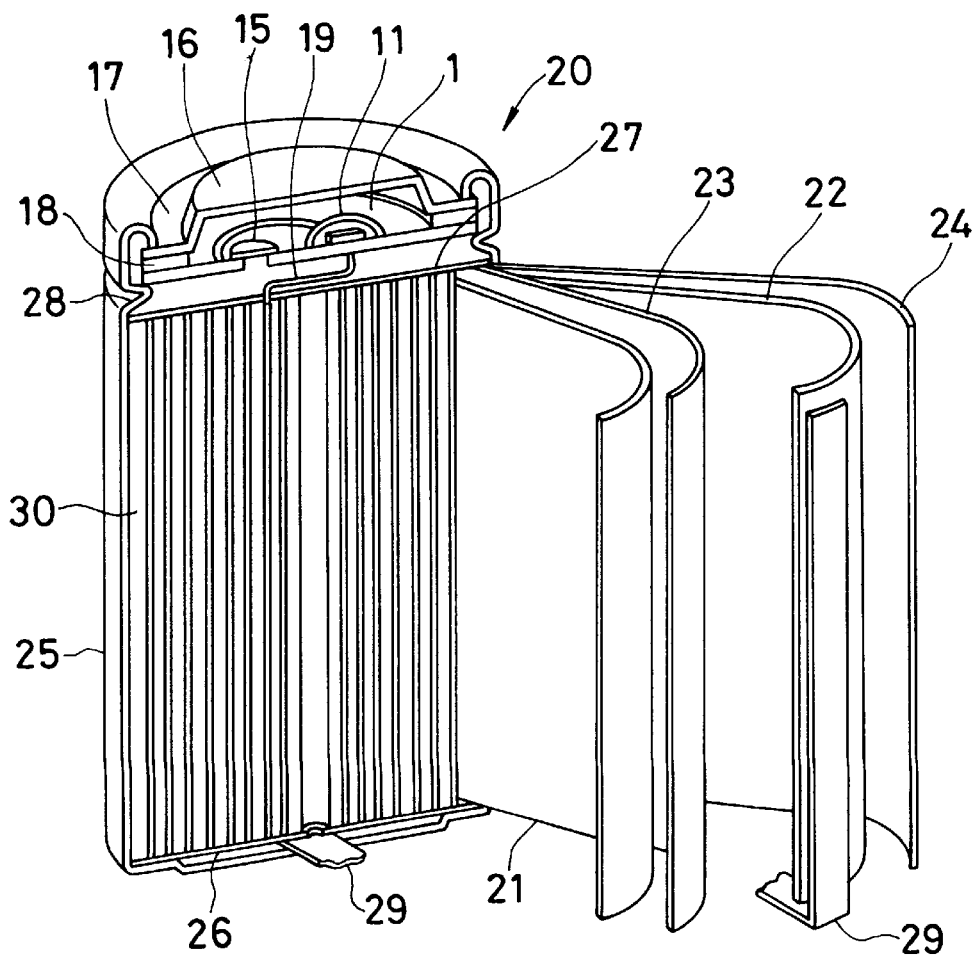
FIG. 3 shows an embodiment of the battery according to the present invention in a partly fractured perspective view.

FIG. 3 illustrates an embodiment in which the protecting element according to the present invention is applied to a cylindrical lithium ion secondary battery, in which the battery is denoted by 20, wherein pairs of a sheet-formed cathode 21 and a sheet-formed anode 22 are wound spirally under interposition therebetween each with a separator sheet 23, 24 to build up an electrode module which is accommodated within an elctrode reaction chamber 30 of an anode terminal 25 of a form of a can isolately therefrom by insulator plates 26, 27. Above the electrode reaction chamber 30 is disposed a stratified unit composed of a cathode terminal 16, a PTC element 18 and a battery protecting element 1, which is fixed by a caulking region 28 at its periphery. 29 denotes an anode lead connecting the anode terminal 25, which serves as a casing, with the anode 22.

The protecting element 1 is installed together with the PTC element integrally within the anode terminal 25 to build up the battery 20. Here, the second conductor layer 4 is connected to the cathode lead 19 and the flange 17 of the cathode terminal 16 is pressedly bound at the caulking portion 28 with the cathode terminal side conductor layer patch 3*b* of the first conductor layer 3 under interposition of the PTC element 18 therebetween to establish an electroconductive connection.

In operation, the electric current generated by the electrode reactions at the cathode 21 and anode 22 flows from the cathode 21, through the cathode lead 19, the second conductor layer 4, the connecting conductor layer 12 of the through-hole 6, the cathode side conductor layer patch 3*a*, the low-melting metal layer 8 and the cathode terminal side conductor layer patch 3*b* to the cathode terminal 16. When the protecting element 1 is used as a current-type fuse, the low-melting metal layer 8 will melt down by Joule heat upon occurrence of an overcurrent by exceeding a certain limiting value due to, for example, short-circuit or the like. When the protecting element 1 is used as a temperature-type fuse, the melting point of the low-melting metal is chosen such that it will melt down not only by heat evolution through Joule heat but also by heat evolution due to, for example, an abnormal electrode reaction etc.

Since the low-melting metal layer 8 is sheathed with a flux 8*a*, the low-melting metal once melted down will be covered immediately by the flux 8*a* so that an accidental electric conduction after the melt-down due to an eventual contact of the molten metal with the conductor layer is prevented. The low-melting metal layer 8 is encased in a protection member 10 in a form of a cap or the like, so that the melt-down of the fuse occurs always within the protection member 10, whereby any accidental electric conduction from the melted metal to other conductor layer can be avoided.

Due to the presence of the safety valve 15 in the through-hole 6, the protecting element can serve not only for effecting melt-down of the low-melting metal layer 8 but also for effecting rupture of the closure member 13 upon exceeding a certain limiting value of the internal pressure of the battery 20 to relieve the pressure. Thus, when the internal pressure of the battery 20 is increased due to an eventual overcurrent or an abnormal condition during the operation of the battery, the closure member 13 will rupture upon reaching a certain limiting pressure, whereby the internal gas of the battery will vent out to relieve the pressure and, thus, an accident the bursting of the battery 20 is prevented.

The closure member 13 has a sheet-like form and can maintain a constant thickness easily so as to adjust the rupture strength of the closure member at a constant value, as contrasted to the recess formed on the base plate by press work in -the prior art. Therefore, by maintaining the inner surface area of the closure member that receives the internal pressure, at a definite value by settling the size of the through-hole 6, it is possible to realize a constant actuation pressure of the valve to thereby increase the safety and the reliability. By altering the thickness of the closure member 13 or varying the size of the through-hole 6, the actuation pressure thereof can voluntarily be settled.

The safety valve 15 is arranged by making use of the through-hole 6 in the base board 5 of the protecting element 1 so that common component parts can be used therefor, whereby the entire protecting element can be constructed as a multifunctional and small-sized unit which can be installed easily, even in a small battery.

The protecting element according to the present invention can be used for every battery irrespective of primary and secondary batteries including lithium batteries and other batteries and is especially adapted to those secondary batteries subjected to repeated charge and discharge operations. Such batteries may be in any voluntary shape including cylindrical and rectangular forms and even in a button form.

While the battery protecting element 1 according to the present invention is adapted to be installed in the battery 20, it is of course possible not to be installed within each battery cell but to use it in a battery arrangement by, for example, connecting with one or more battery cells in a battery package or in a battery case. Here also, it is possible to attain a miniaturization of such a battery arrangement.

The above battery protecting element has a simple structure, in which a low-melting metal layer 8 is arranged to bridge between the conductor layer patches 3*a* and 3*b* formed in the conductor layer 3 on a multilayered base board 5, so that it is easy to design as a small-sized element and is possible to be installed within the battery cell without altering the structure of the battery cell and its production plan to a considerable extent, while attaining a reliable detection of exceeding of a certain limit of temperature and/or current to cause melt-down of the fuse authentically. It is possible to employ conductors of different characteristics in combination, for example, copper which is superior in workability and solderability for the first conductor layer 3 and aluminum which has better resistance to the electrolyte solution for the second conductor layer 4.

It is made possible to construct the battery protecting element 1 multifunctionally for detecting reliably that the internal pressure of the battery cell has exceeded a certain limit and for effecting relief of the internal pressure, without necessitating the design of the protecting element as a large-sized unit, since the safety valve 15 is formed by making use of the through-hole 6 formed in the multilayered base board 5.

Thus, it is possible to realize a battery which can detect an abnormal state in the temperature and current and, if necessary, in the internal pressure thereof, to release the protecting operation, by installing the protecting element 1 described above in the battery 20, whereby occurrence of any accident can authentically be prevented.

EXAMPLE

In the following, the present invention will further be described by way of an example of the present invention.

A ternary layered base board 5 composed of an insulator layer 2 (with a thickness of 0.08 mm) interposed between a first conductor layer 3 of copper foil (with a thickness of 0.035 mm) and a second conductor layer 4 of aluminum (with a thickness of 1.0 mm) was shaped into a disk in conformity with the shape of the cathode terminal 16. Then, the copper foil of the first conductor layer 3 was subjected to a chemical etching to isolate patterned patches of the conductor layer. By adapting the outer shape of the fuse unit 11 to the internal shape of the cathode terminal 16, any space loss inside the battery 20 was prevented.

The base board 5 was then perforated by means of an NC drill in a pierced-through hole of a diameter of 2 mm to form a through-hole 6, in which a cylindrical copper grommet was inserted to build up a connecting conductor layer 12. Then, a disk of a diameter of 3 mm was cut from a copper foil of a thickness of 18 μm to prepare a closure member 13, which was fixed onto the conductor layer patch around the through-hole 6 by soldering so as to close the through-hole 6 to construct a safety valve 15 which prevent evaporation of the electrolyte solution.

Thereafter, a layer 8 of a low-melting metal (2 mm×4 mm×0.2 mm) of a composition of Bi54/In30/Sn16 having a melting point of 80° C. was fixed by soldering so as to bridge between the conductor layer patch 3a around the through-hole and the conductor layer patch 3b on the side of the cathode terminal 16, whereupon the entire surface of the low-melting alloy layer 8 was coated with a flux 8a. A protecting cap 10 made of a polyamide resin was arranged so as to encase the entire section including the low-melting metal layer 8 therein to build up the fuse unit 11. A lead wire 19 guided from the cathode 21 was connected to the second conductor layer 4 and the cathode terminal 16 was attached to the first conductor layer 3 under interposition of a PTC element 18 integrally therewith to build up the battery 20.

In this battery 20, the low-melting metal layer 8 was melted down when the internal temperature reached 80±2° C., whereby the current was shut off, and the closure member 13 was ruptured when the internal pressure reached a value of 1.5±0.1 MPa (gauge), whereby the pressure was relieved.

We claim:

1. A battery having a protecting element, which comprises
    a cathode and an anode for effecting electrode reactions disposed in an electrode reaction part,
    a cathode terminal connected to the cathode,
    an anode terminal connected to the anode and
    a protecting element inserted in the connecting current path from the cathode to the cathode terminal or in the connecting current path from the anode to the anode terminal,
    said protecting element comprising
        a base board composed of a first and a second conductor layer and an insulator layer interposed between said first and second conductor layers,
        a through-hole formed in the base board and a conductive member contained therein to provide electrical conduction between the first and the second conductor layers,
        at least one vacant space disposed in at least either one of said conductor layers in such a pattern as to leave a plurality of independent patches of conductor layer which are separated by the vacant space and
        one or more layers of a low-melting metal so arranged as to bridge the separated conductor patches to provide electrical conduction therebetween.

2. A battery as claimed in claim 1, wherein the protecting element is inserted in the current path from the cathode to the cathode terminal.

3. A battery as claimed in claim 2, wherein the first conductor layer connects to the cathode terminal and the second conductor layer connects to the cathode.

4. A battery as claimed in claim 1, wherein the protecting element includes a lamellar closure member fixed to the base board so as to cover and close the through-hole.

5. A protecting element for battery, comprising
    a base board composed of a first and a second conductor layer and an insulator layer interposed between said first and second conductor layers,
    a through-hole formed in the base board and a conductive member contained therein to provide electrical conduction between the first and the second conductor layers,
    at least one vacant space disposed in at least either one of said conductor layers in such a pattern as to leave a plurality of independent patches of conductor layer which are separated by the vacant space and
    one or more layers of a low-melting metal so arranged as to bridge the separated conductor patches to provide electrical conduction therebetween.

6. A protecting element as claimed in claim 5, wherein it includes a lamellar closure member fixed to the base board so as to cover and close the through-hole.

7. A protecting element as claimed in claim 5, wherein the first conductor layer is made of copper and the second conductor layer is made of aluminum.

8. A protecting element as claimed in claim 5, wherein the low-melting metal layer is covered by flux.

9. A protecting element as claimed in claim 5, wherein the junction portions between the low-melting metal layer and the conductor patches are covered by a protection member.

* * * * *